UNITED STATES PATENT OFFICE.

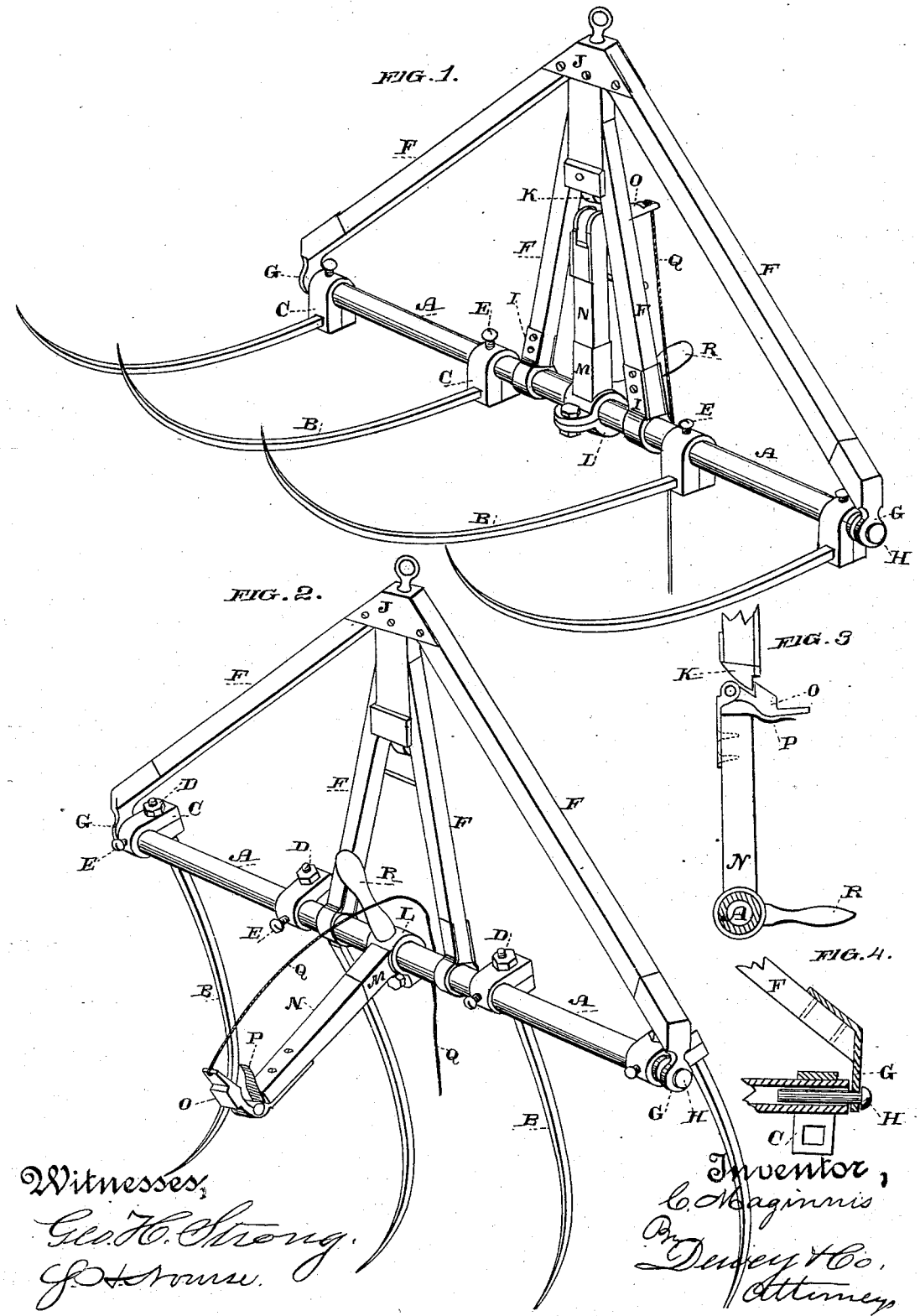

CHRISTOPHER MAGINNIS, OF SAN FRANCISCO, CALIFORNIA.

HORSE HAY-FORK.

SPECIFICATION forming part of Letters Patent No. 317,556, dated May 12, 1885.

Application filed March 1, 1884. (No model.)

*To all whom it may concern:*

Be it known that I, CHRISTOPHER MAGINNIS, of the city and county of San Francisco, and State of California, have invented an Improvement in Horse Hay-Forks; and I hereby declare the following to be a full, clear, and exact description thereof.

My invention relates to certain improvements in horse hay-forks; and it consists of a tubular head for the fork, a means for securing the fork-tines to the head, and the frame by which the fork is suspended latched to retain its load, or unlatched to discharge it.

Referring to the accompanying drawings for a more complete explanation of my invention, Figure 1 is a perspective view of my fork latched, ready for a load. Fig. 2 is a view showing the fork unlatched. Figs. 3 and 4 are details of construction.

A is the head of a horse hay-fork, made of tubular steel or iron, and of a size and thickness sufficient to resist the strains it may be subjected to.

The curved tines B are pointed at their outer ends in the usual manner, so as to readily enter the hay or straw. The inner ends are fitted to pass through the two sides of clamps C, below the head, and extend out behind sufficiently to receive nuts D, screw-threads being cut upon them for this purpose.

A shoulder is formed upon each tine, so that it will press against the front side of the clamp while the nut is turned up against the rear side. The clamp C is forged, cast, or otherwise formed to inclose the head A, while the two ends which project below the head do not come close together. When the tine is put through the holes bored through these two sides for that purpose, and the nut turned up on the rear end of the tine, it serves to draw these sides together, so as to clamp the head firmly, and thus hold the tine and prevent its turning. In order to insure its position more surely, a hole is bored through the top of the clamp, and a set-screw, E, screws down either upon a flattened surface prepared for it on the head A or it may enter a hole formed in the head to receive it.

The fork-head is suspended from a frame composed of arms F, two of which extend from the common center, where they are united, to the ends of the head, and two others to points between the central pair of tines. The outside arms F have iron sockets fitted to their ends, with projecting lugs G, through which stout journal-pins H extend into the tubular head, so as to allow it to turn upon them. The central pair of arms F have straps I secured to them and clasping the head at the points where the arms meet it. The upper ends of the arms F converge, and are secured within an iron socket, J, which has a strong eye, to which the hoisting-rope is secured.

By this construction I make the fork very light and strong, and support the head from points near each tine, so that it is impossible for it to bend or sag out of shape by reason of the weight of the load.

Between the two central arms, F, at a point near their upper uniting ends, is fixed a block having a lug, K, to act as a catch for the latch. The block is equal in thickness to the arms F, and has a flange or plate upon each side, which extends over and clasps the arms, so that when secured in place all is held firmly and rigidly.

At the center of the head is a clamp, L, having a socket, M, projecting upwardly from it, and a short arm, N, is secured in this socket, projecting upward. A latch, O, is hinged upon the top of this arm, and has a spring, P, beneath it. This latch is in such a position that when the frame F is swung over it the latch will engage the lug or catch K between the arms F, and thus hold the fork in place with its load. The outer end of the latch extends far enough back to leave an eye for the latch-cord Q, and when this latter is pulled the spring P will be depressed sufficiently to release the latch and allow the fork to turn and discharge its contents.

A handle, R, is fixed to the rear of the clamp L, extending back, so as to provide an easy means for handling the fork.

Having thus described my invention, what I claim as new, and desire to secure by Letters Patent, is—

1. In a horse hay-fork, a hollow tubular head having its ends supported by journal-pins, and its center by straps, respectively, from frame-arms F, which converge from points near each tine to a common center above, substantially as herein described.

2. In a horse hay-fork, and in combination with the fork-head, a frame composed of arms having their upper uniting ends secured in a socket with a suspending eye, the outer arms having sockets at their lower ends with lugs, through which journal-pins enter the ends of the head, and the central arms having bands which surround the head near the inner pair of tines, and within which said head turns or swivels, substantially as herein described.

3. In a horse hay-fork, a hollow tubular head swiveled from a suspending-frame, as shown, in combination with the clamps surrounding the head, the ends of said clamps projecting below the head and perforated to receive the rear ends of the tines, and the clamp-nuts to screw upon the rear of the tines, substantially as herein described.

4. In a horse hay-fork, a tubular head swiveled from a suspended frame, clamps surrounding the head with their ends projecting below the head, shouldered tines passing through holes in these projecting ends, with clamping-nuts, in combination with set or holding screws E, substantially as herein described.

5. In a horse hay-fork, the combination of a tubular head with tines clamped to it, as shown, a frame composed of diverging timbers, having journal-pins, and straps upon which the head is supported and turns, and a lug or catch, K, secured to the central arms, an arm, N, clamped to the center of the head and projecting upward between the central frame-arms, a latch, O, and spring P, secured to the upper end of said arm N, and the latch-cord Q, substantially as herein described.

In witness whereof I have hereunto set my hand.

CHRISTOPHER MAGINNIS.

Witnesses:
GEO. H. STRONG,
H. C. LEE.